(12) United States Patent
Lee et al.

(10) Patent No.: US 10,403,452 B1
(45) Date of Patent: Sep. 3, 2019

(54) KEYBOARD DEVICE

(71) Applicant: Primax Electronics Ltd., Taipei (TW)

(72) Inventors: Yi-Shu Lee, Taipei (TW); Lei-Lung Tsai, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/144,853

(22) Filed: Sep. 27, 2018

(30) Foreign Application Priority Data

Jul. 27, 2018 (TW) .............................. 107126189 A

(51) Int. Cl.
*H01H 13/10* (2006.01)
*H01H 13/7065* (2006.01)
*H01H 13/26* (2006.01)
*G06F 3/02* (2006.01)

(52) U.S. Cl.
CPC ....... *H01H 13/7065* (2013.01); *G06F 3/0202* (2013.01); *H01H 13/10* (2013.01); *H01H 13/26* (2013.01)

(58) Field of Classification Search
CPC ...... H01H 13/705; H01H 13/83; H01H 3/125; H01H 13/14; H01H 13/70; H01H 13/7065; H01H 2215/006; H01H 2233/07; H01H 13/52; H01H 13/20; H01H 2227/028; H01H 13/10; H01H 13/26
See application file for complete search history.

(56) References Cited

U.S. PATENT DOCUMENTS

| | | | | |
|---|---|---|---|---|
| 5,901,837 A * | 5/1999 | Aimi | ...................... | H01H 3/125 200/344 |
| 6,747,867 B2 * | 6/2004 | Hsu | ........................ | G06F 1/1616 200/5 A |
| 8,299,382 B2 * | 10/2012 | Takemae | ................ | H01H 3/125 200/341 |
| 8,481,874 B2 * | 7/2013 | Takagi | ................... | H01H 3/125 200/344 |
| 9,437,378 B2 * | 9/2016 | Nishino | ............... | H01H 13/705 |

* cited by examiner

*Primary Examiner* — Ahmed M Saeed
(74) *Attorney, Agent, or Firm* — Kirton McConkie; Evan R. Witt

(57) ABSTRACT

A keyboard device includes a base plate, a butterfly-type connecting element and a keycap assembly. The keycap assembly includes a coupling frame and a keycap. The coupling frame includes a first coupling part. The keycap includes a second coupling part. The butterfly-type connecting element is connected with the base plate and the coupling frame. The coupling frame and the butterfly-type connecting element are combined together through the first coupling part and the second coupling part. When the pressing force is acted on a corner of the keycap, the pressing force can be transferred to the whole keycap through the coupling frame. Consequently, the pressing force can be effectively transferred.

8 Claims, 6 Drawing Sheets

KEYBOARD DEVICE

FIELD OF THE INVENTION

The present invention relates to a keyboard device, and more particularly to a keyboard device with plural key structures.

BACKGROUND OF THE INVENTION

Generally, the widely-used peripheral input device of a computer system includes for example a mouse device, a keyboard device, a trackball device, or the like. Via the keyboard device, characters or symbols can be directly inputted into the computer system. As a consequence, most users and most manufacturers of input devices pay much attention to the development of keyboard devices. For example, a keyboard device with plural key structures is one of the common keyboard devices.

Hereinafter, a key structure of a keyboard device is shown. The key structure comprises a scissors-type connecting element. FIG. 1 is a schematic cross-sectional side view illustrating a conventional key structure. As shown in FIG. 1, the conventional key structure 1 comprises a keycap 11, a scissors-type connecting element 12, a rubbery elastomer 13, a membrane switch circuit member 14 and a base plate 15. The keycap 11, the scissors-type connecting element 12, the rubbery elastomer 13 and the membrane switch circuit member 14 are supported by the base plate 15. The scissors-type connecting element 12 is used for connecting the base plate 15 and the keycap 11.

The scissors-type connecting element 12 is arranged between the base plate 15 and the keycap 11, and the base plate 15 and the keycap 11 are connected with each other through the scissors-type connecting element 12. The scissors-type connecting element 12 comprises a first frame 121 and a second frame 122. A first end of the first frame 121 is connected with the keycap 11. A second end of the first frame 121 is connected with the base plate 15. The rubbery elastomer 13 is enclosed by the scissors-type connecting element 12. The membrane switch circuit member 14 comprises plural key intersections (not shown). When one of the plural key intersections is triggered, a corresponding key signal is generated. The rubbery elastomer 13 is disposed on the membrane switch circuit member 14. Each rubbery elastomer 13 is aligned with a corresponding key intersection. When the rubbery elastomer 13 is depressed, the rubbery elastomer 13 is subjected to deformation to push the corresponding key intersection of the membrane switch circuit member 14. Consequently, the corresponding key signal is generated.

The operations of the conventional key structure 1 in response to the depressing action of the user will be illustrated as follows. Please refer to FIG. 1 again. When the keycap 11 is depressed, the keycap 11 is moved downwardly to push the scissors-type connecting element 12 in response to the depressing force. As the keycap 11 is moved downwardly relative to the base plate 15, the keycap 11 pushes the corresponding rubbery elastomer 13. At the same time, the rubbery elastomer 13 is subjected to deformation to push the membrane switch circuit member 14 and trigger the corresponding key intersection of the membrane switch circuit member 14. Consequently, the membrane switch circuit member 14 generates a corresponding key signal. When the keycap 11 is no longer depressed by the user, no external force is applied to the keycap 11 and the rubbery elastomer 13 is no longer pushed by the keycap 11. In response to the elasticity of the rubbery elastomer 13, the rubbery elastomer 13 is restored to its original shape to provide an upward elastic restoring force. Consequently, the keycap 11 is returned to its original position where it is not depressed. The structures and the operations of the conventional key structure have been mentioned as above.

With increasing development of science and technology, the functionality and slimness benefit of the keyboard device are gradually enhanced and thus the demands of the user on the keyboard device are gradually increased. For example, the user prefers that the thickness of the keyboard device is reduced and the movement of the key structure is more stable when the key structure is depressed. For achieving the above purpose, a keyboard device with a butterfly-type connecting element has been introduced into the market and disclosed in U.S. Pat. No. 6,586,695. The keyboard device as disclosed in U.S. Pat. No. 6,586,695 comprises a keycap, a butterfly-type connecting element and a fixing element. The butterfly-type connecting element comprises a first frame and a second frame. The first frame is located beside a first side of the keycap and connected with a middle region of the keycap and the fixing element. The second frame is located beside a second side of the keycap and connected with the middle region of the keycap and the fixing element. While the keycap is depressed, the keycap is moved downwardly to push the butterfly-type connecting element. Consequently, the first frame and the second frame are swung and slid relative to the fixing element, and the function of depressing the key structure is achieved.

In the butterfly-type connecting element, the first frame and the second frame are located adjacent to each other. In comparison with the scissors-type connecting element, the displacement amount of the butterfly-type connecting element in the vertical direction is small. Consequently, the movement of the key structure is more stable when the key structure is depressed, and the keyboard device with the butterfly-type connecting element is thinner. However, since both of the first frame and the second frame are connected with the middle region of the keycap, some drawbacks occur. For example, when a corner of the keycap is depressed, the pressing force cannot be effectively transferred to the butterfly-type connecting element. Under this circumstance, it is difficult to depress the butterfly-type connecting element. In other words, the user has to accurately press the middle region of the keycap in order to smoothly depress the keycap.

Therefore, there is a need of providing a keyboard device for transferring the pressing force easily.

SUMMARY OF THE INVENTION

An object of the present invention provides a keyboard device for transferring the pressing force easily.

In accordance with an aspect of the present invention, there is provided a keyboard device. The keyboard device includes a base plate, a butterfly-type connecting element and a keycap assembly. The butterfly-type connecting element is disposed on the base plate and connected with the base plate. The keycap assembly is connected with the butterfly-type connecting element and movable relative to the base plate. The keycap assembly includes a coupling frame and a keycap. The coupling frame is located over the butterfly-type connecting element and connected with the butterfly-type connecting element. The coupling frame includes a main body, plural first coupling parts and plural coupling holes. The plural first coupling parts are disposed on outer surfaces of lateral walls of the main body. The plural coupling holes are formed in middle regions of the lateral walls of the main body. The butterfly-type connecting element is partially inserted into the coupling holes. Consequently, the coupling frame and the butterfly-type connecting element are combined together. The keycap is exposed outside the keyboard device. The coupling frame is covered by the keycap. The keycap includes plural second coupling parts. When the second coupling parts are connected with the corresponding first coupling parts, the coupling frame is fixed on an inner surface of the keycap.

In an embodiment, the butterfly-type connecting element includes a first frame and a second frame. The first frame is located under the keycap and located beside a first side of the keycap. A first end of the first frame is inserted into the corresponding coupling holes such that the first frame is connected with the coupling frame. A second end of the first frame is connected with the base plate. A second frame is located under the keycap and located beside a second side of the keycap. A first end of the second frame is inserted into the corresponding coupling holes such that the second frame is connected with the coupling frame. A second end of the second frame is connected with the base plate. While the keycap is depressed, the coupling frame is pushed by the keycap and moved relative to the base plate, and the first frame and the second frame are swung in response to a movement of the coupling frame.

From the above descriptions, the present invention provides the keyboard device. The butterfly-type connecting element is connected with the base plate and the coupling frame. The keycap and the coupling frame are combined together through the first coupling parts and the second coupling parts. In accordance with the conventional technology, the butterfly-type connecting element is connected with the middle region of the keycap. In contrast, the butterfly-type connecting element of the keyboard device of the present invention is connected with the ring-shaped coupling frame. Consequently, when the pressing force is acted on the corner of the keycap, the pressing force can be transferred to the whole keycap through the coupling frame. In other words, the keyboard device of the present invention can overcome the drawbacks of the conventional technology.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional technologies, the present invention provides a keyboard device.

Figure 1:
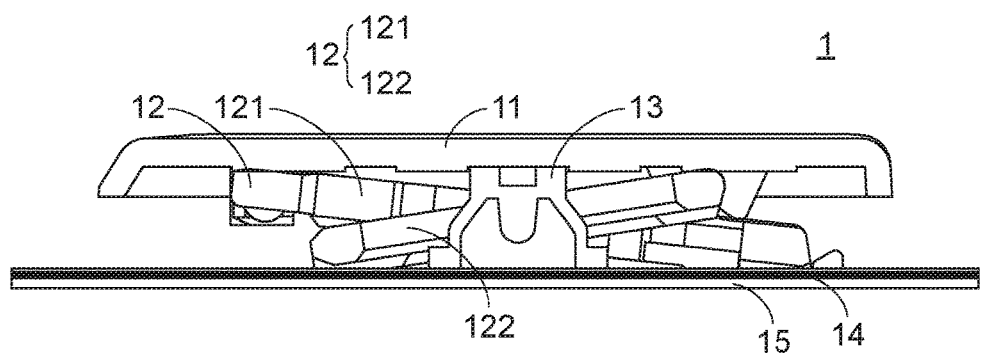
FIG. 1 is a schematic cross-sectional side view illustrating a conventional key structure.
Figure 2:
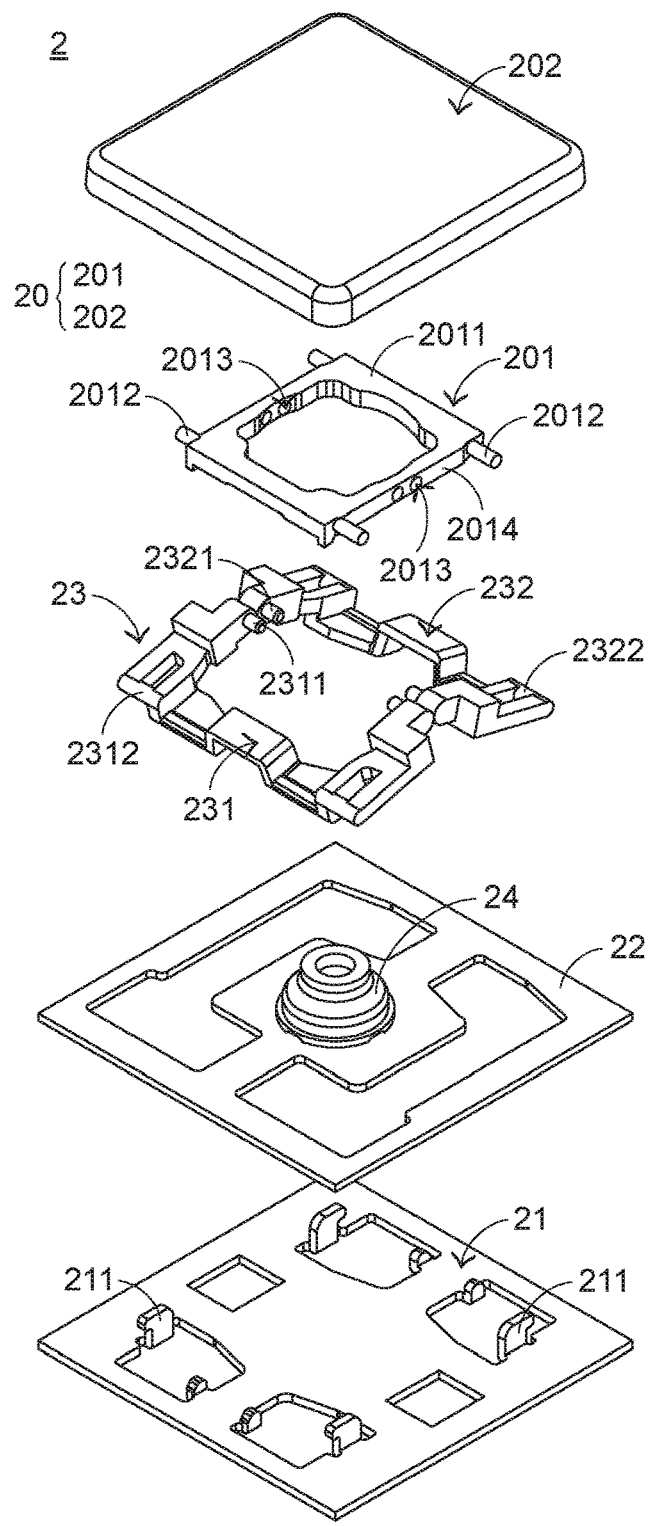
FIG. 2 is a schematic exploded view illustrating a portion of a keyboard device according to an embodiment of the present invention.
Figure 3:
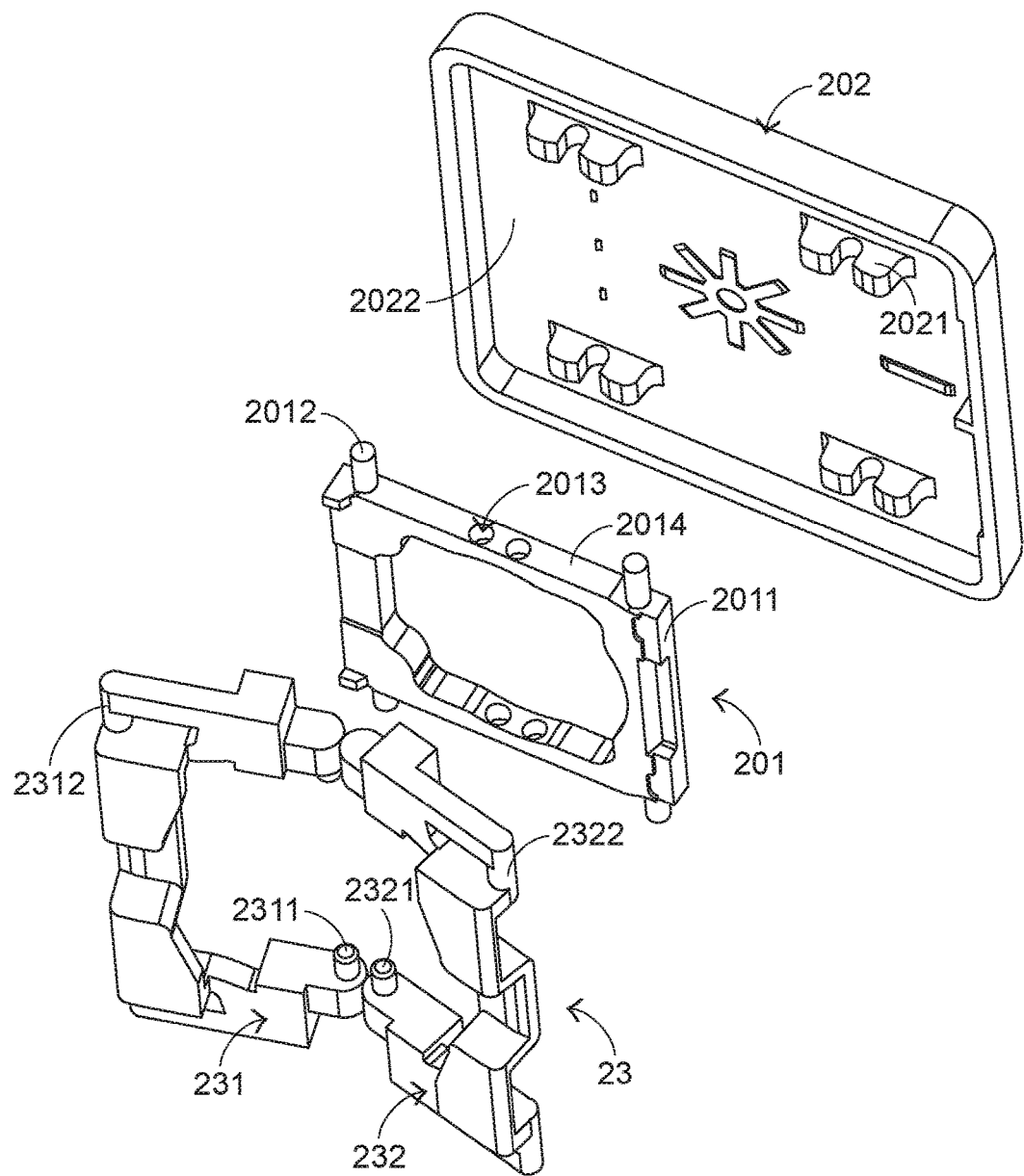
FIG. 3 is a schematic exploded view illustrating a portion of the keyboard device according to the embodiment of the present invention and taken along another viewpoint.

Hereinafter, the structure of the keyboard device of the present invention will be illustrated with reference to FIGS. 2 and 3. FIG. 2 is a schematic exploded view illustrating a portion of a keyboard device according to an embodiment of the present invention. FIG. 3 is a schematic exploded view illustrating a portion of the keyboard device according to the embodiment of the present invention and taken along another viewpoint. The keyboard device 2 comprises plural keycap assemblies 20, a base plate 21, a switch circuit board 22, plural butterfly-type connecting elements 23 and plural elastic elements 24. For succinctness, only one keycap assembly 20, one butterfly-type connecting element 23 and one elastic element 24 are shown in the drawings. The plural keycap assemblies 20 are exposed outside the keyboard device 2. When one of the keycap assemblies 20 is depressed by the user's finger, a corresponding key signal is generated and issues to a computer (not shown) that is in communication with the keyboard device 2. Consequently, the computer executes a function corresponding to the depressed key structure.

The base plate 21 is located under the plural keycap assemblies 20 and connected with the plural butterfly-type connecting elements 23. The plural butterfly-type connecting elements 23 are disposed on the base plate 21, and connected with the base plate 21 and the corresponding keycap assemblies 20. As mentioned above, the keycap assembly 20 is connected with the corresponding butterfly-type connecting element 23. Consequently, when the keycap assembly 20 is depressed, the corresponding butterfly-type connecting element 23 is swung and slid relative to the base plate 21 and the keycap assembly 20 is moved relative to the base plate 21.

The switch circuit board 22 is arranged between the plural keycap assemblies 20 and the base plate 21. The keycap assembly 20 comprises a coupling frame 201 and a keycap 202. The elastic element 24 is arranged between the corresponding keycap 202 and the switch circuit board 22, and penetrated through the coupling frame 201. When one of the plural keycaps 202 is depressed by the user, the keycap 202 is moved downwardly to push the elastic element 24 and the switch circuit board 22 is triggered. In an embodiment, the elastic elements 24 are rubbery elastomers, and the switch circuit board 22 is a membrane switch circuit board. The inner structure of the switch circuit board 22 comprises an upper wiring plate, a lower wiring plate and a separation layer. The upper wiring plate, the lower wiring plate and the separation layer are well known to those skilled in the art, and are not redundantly described herein.

As shown in FIGS. 2 and 3, the keycap assembly 20 comprises the coupling frame 201 and the keycap 202. The coupling frame 201 is located over the corresponding butterfly-type connecting element 23 and connected with the corresponding butterfly-type connecting element 23. The coupling frame 201 comprises a main body 2011, plural first coupling parts 2012 and plural coupling holes 2013. The plural first coupling parts 2012 are disposed on outer surfaces of lateral walls 2014 of the main body 2011. The plural coupling holes 2013 are formed in the middle regions of the lateral walls 2014 of the main body 2011. The corresponding parts of the butterfly-type connecting element 23 are inserted into the coupling holes 2013. Consequently, the coupling frame 201 and the butterfly-type connecting element 23 are combined together. The keycap 202 is exposed outside the keyboard device 2, and the coupling frame 201 is covered by the keycap 202. The keycap 202 comprises plural second coupling parts 2021. After the second coupling parts 2021 are connected with the corresponding first coupling parts 2012, the coupling frame 201 is fixed on an inner surface 2022 of the keycap 202.

In this embodiment, the main body 2011 has a rectangular ring shape corresponding to keycap 202, the first coupling parts 2012 are coupling posts, and the second coupling parts 2021 are coupling hooks corresponding to the coupling posts. The examples of these components are presented herein for purpose of illustration and description only. In another embodiment, the first coupling parts are coupling hooks, and the second coupling parts are coupling posts corresponding to the hooks. It is noted that the first coupling parts of the coupling frame and the corresponding second coupling parts of the keycap are complementary structures.

The butterfly-type connecting element 23 comprises a first frame 231 and a second frame 232. The first frame 231 is located under the keycap 202 and located beside a first side of the keycap 202. A first end 2311 of the first frame 231 is inserted into the corresponding coupling holes 2013 (e.g., the coupling holes 2013 at the left side of FIG. 2), and thus the first frame 231 is connected with the coupling frame 201. A second end 2312 of the first frame 231 is connected with the base plate 21. The second frame 232 is located under the keycap 202 and located beside a second side of the keycap 202. That is, the second frame 232 is located adjacent to the first frame 231. A first end 2321 of the second frame 232 is inserted into the corresponding coupling holes 2013 (e.g., the coupling holes 2013 at the right side of FIG. 2), and thus the second frame 232 is connected with the coupling frame 201. A second end 2322 of the second frame 232 is connected with the base plate 21. In an embodiment, the first frame 231 and the second frame 232 are U-shaped.

The base plate 21 comprises plural base hooks 211. The base hooks 211 are disposed on a top surface of the base plate 21. The base hooks 211 are connected with the second end 2312 of the first frame 231 or the second end 2322 of the second frame 232. Consequently, the butterfly-type connecting element 23 and the base plate 21 are combined together. In an embodiment, the base hooks 211 are integrally formed with the base plate 21, and the base hooks 211 are open-type structures. Consequently, the second end 2312 of the first frame 231 or the second end 2322 of the second frame 232 can be rotated and slid relative to the corresponding base hooks 211.

Figure 4:
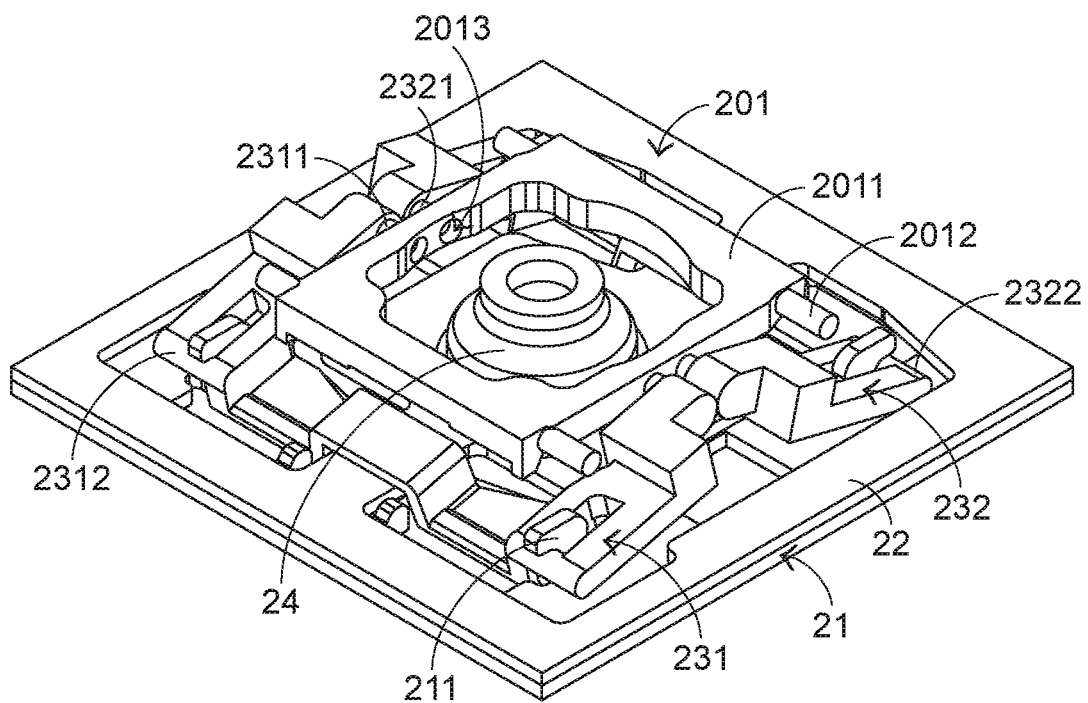
FIG. 4 is a schematic perspective view illustrating a portion of the keyboard device according to the embodiment of the present invention.
Figure 5:
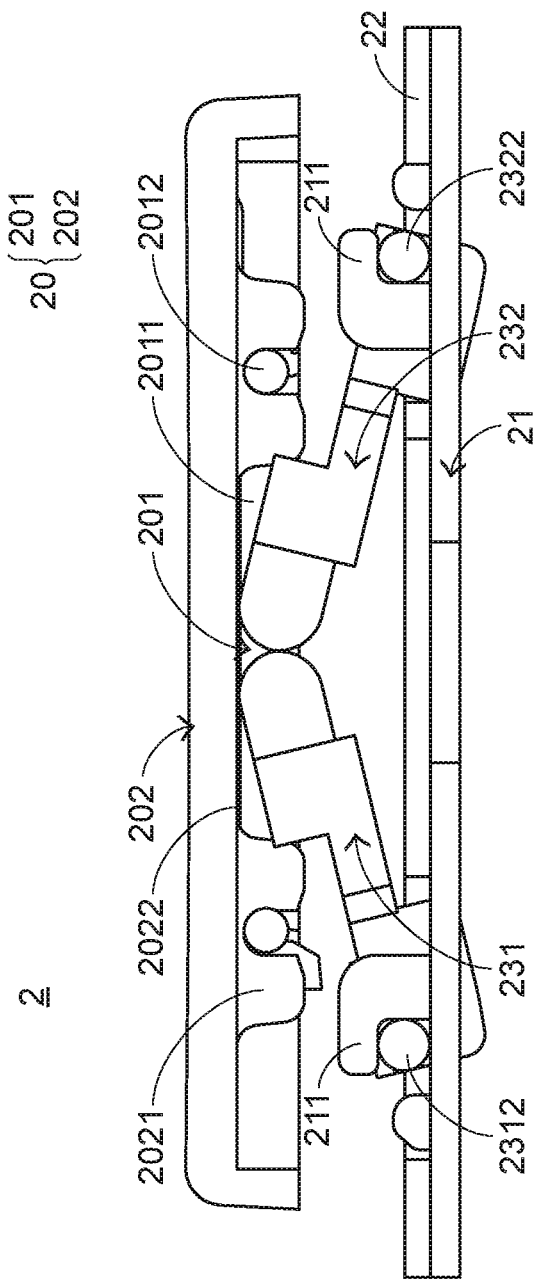
FIG. 5 is a schematic cross-sectional side view illustrating a portion of the keyboard device according to the embodiment of the present invention, in which the keycap is not depressed.
Figure 6:
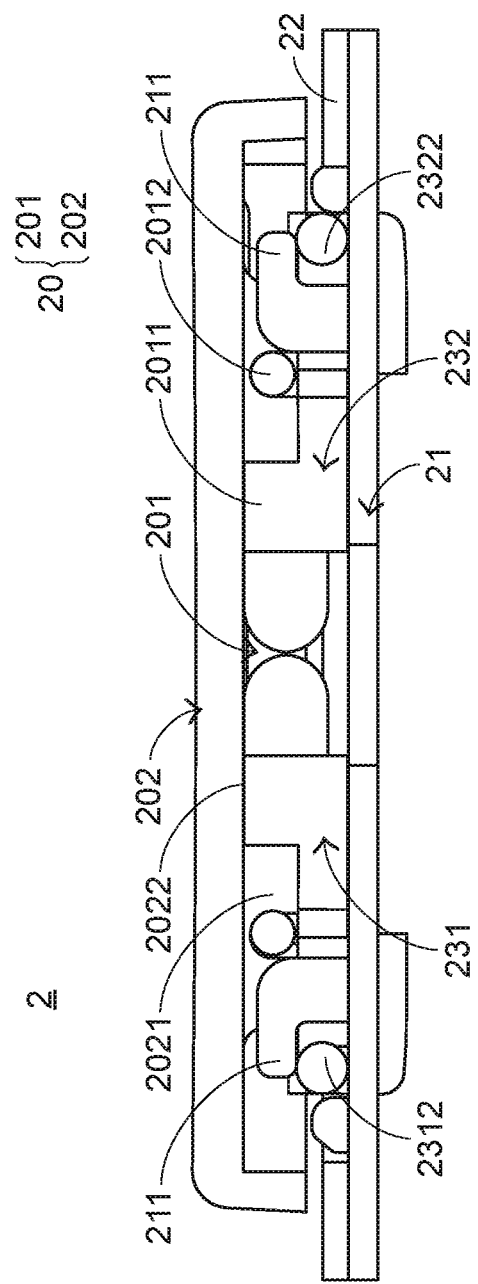
FIG. 6 is a schematic cross-sectional side view illustrating a portion of the keyboard device according to the embodiment of the present invention, in which the keycap is depressed.

Please refer to FIGS. 4, 5 and 6. FIG. 4 is a schematic perspective view illustrating a portion of the keyboard device according to the embodiment of the present invention. FIG. 5 is a schematic cross-sectional side view illustrating a portion of the keyboard device according to the embodiment of the present invention, in which the keycap is not depressed. FIG. 6 is a schematic cross-sectional side view illustrating a portion of the keyboard device according to the embodiment of the present invention, in which the keycap is depressed. The connecting relationships between associated components are shown in FIGS. 4 and 5. The coupling frame 201 is fixed on the inner surface 2022 of the keycap 202. While the keycap 202 of the keycap assembly 20 is depressed by the user, the keycap 202 and the coupling frame 201 are moved downwardly relative to the base plate 21, and the first frame 231 and the second frame 232 are swung relative to the base plate 21 in response to the movement of the coupling frame 201. In addition, the second end 2312 of the first frame 231 and the second end 2322 of the second frame 232 are rotated and slid within the corresponding base hooks 211.

At the same time, the keycap 202 is moved downwardly to push the elastic element 24. Consequently, the elastic element 24 is subjected to deformation, and the switch circuit board 22 is triggered by the elastic element 22 (see FIG. 6). Under this circumstance, the switch circuit board 22 generates a corresponding key signal. When the keycap assembly 20 is no longer depressed by the user, the keycap 202 and the coupling frame 201 are moved upwardly relative to the base plate 21 in response to an elastic force of the elastic element 24. As the coupling frame 201 is moved upwardly, the butterfly-type connecting element 23 is swung from the state of FIG. 6 to the state of FIG. 5. Consequently, the keycap 202 is returned to its original position.

The following two aspects should be specially described. Firstly, the first end 2311 of the first frame 231 and first end 2321 of the second frame 232 are connected with the middle region of the coupling frame 201. As mentioned above, the main body 2011 of the coupling frame 201 has a rectangular ring shape corresponding to keycap 202, and the coupling frame 201 is fixed on the inner surface 2022 of the keycap 202. Consequently, when the user's finger is placed on a corner of the keycap 202, the pressing force can be transferred to the whole keycap 202 through the structure of the coupling frame 201. In other words, the action of depressing the keycap 202 can be successfully done. In addition, the keycap assembly 20 can provide enhanced tactile feel. Secondly, the arrangements of the first coupling parts 2012 and the second coupling parts 2021 allows the keycap 202 be easily assembled with the coupling frame 201 or easily disassembled from the coupling frame 201. According to the practical requirements, the keycap 202 of the keyboard device 2 made of a specified material (e.g., a plastic material) may be replaced with another keycap (e.g., a keycap made of a glass material or a wood material).

From the above descriptions, the present invention provides the keyboard device. The butterfly-type connecting element is connected with the base plate and the coupling frame. The keycap and the coupling frame are combined together through the first coupling parts and the second coupling parts. In accordance with the conventional technology, the butterfly-type connecting element is connected with the middle region of the keycap. In contrast, the butterfly-type connecting element of the keyboard device of the present invention is connected with the ring-shaped coupling frame. Consequently, when the pressing force is acted on the corner of the keycap, the pressing force can be transferred to the whole keycap through the coupling frame. In other words, the keyboard device of the present invention can overcome the drawbacks of the conventional technology.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A keyboard device, comprising:
   a base plate;
   a butterfly-type connecting element disposed on the base plate and connected with the base plate; and
   a keycap assembly connected with the butterfly-type connecting element and movable relative to the base plate, wherein the keycap assembly comprises:
      a coupling frame located over the butterfly-type connecting element and connected with the butterfly-type connecting element, wherein the coupling frame comprises a main body, plural first coupling parts and plural coupling holes, wherein the plural first coupling parts are disposed on outer surfaces of lateral walls of the main body, and the plural coupling holes are formed in middle regions of the lateral walls of the main body, wherein the butterfly-type connecting element is partially inserted into the coupling holes, so that the coupling frame and the butterfly-type connecting element are combined together; and
      a keycap exposed outside the keyboard device, wherein the coupling frame is covered by the keycap, and the keycap comprises plural second coupling parts, wherein when the second coupling parts are connected with the corresponding first coupling parts, the coupling frame is fixed on an inner surface of the keycap.

2. The keyboard device according to claim 1, wherein the butterfly-type connecting element comprises:
   a first frame located under the keycap and located beside a first side of the keycap, wherein a first end of the first frame is inserted into the corresponding coupling holes such that the first frame is connected with the coupling frame, and a second end of the first frame is connected with the base plate; and
   a second frame located under the keycap and located beside a second side of the keycap, wherein a first end of the second frame is inserted into the corresponding coupling holes such that the second frame is connected with the coupling frame, and a second end of the second frame is connected with the base plate.

3. The keyboard device according to claim 2, wherein the base plate comprises plural base hooks, and the base hooks are disposed on a top surface of the base plate, wherein the base hooks are connected with the second end of the first frame or the second end of the second frame.

4. The keyboard device according to claim 2, wherein while the keycap is depressed, the coupling frame is pushed by the keycap and moved relative to the base plate, and the first frame and the second frame are swung in response to a movement of the coupling frame.

5. The keyboard device according to claim 2, wherein the first frame and the second frame are U-shaped.

6. The keyboard device according to claim 1, wherein the first coupling parts are coupling posts, and the second coupling parts are coupling hooks corresponding to the coupling posts.

7. The keyboard device according to claim 1, further comprising:
   a switch circuit board located under the keycap assembly, wherein when the keycap assembly is moved downwardly to trigger the keycap assembly, a key signal is generated; and
   an elastic element arranged between the keycap and the switch circuit board, and penetrated through the coupling frame, wherein when the keycap is moved to push the elastic element, the switch circuit board is triggered by the elastic element, wherein when the elastic element is not pushed by the keycap, the keycap is returned to an original position in response to an elastic force of the elastic element.

8. The keyboard device according to claim 1, wherein the main body of the coupling frame has a rectangular ring shape corresponding to keycap.

* * * * *